(12) United States Patent
Bangerter et al.

(10) Patent No.: US 10,819,265 B2
(45) Date of Patent: Oct. 27, 2020

(54) METHOD AND APPARATUS FOR CONTROLLING AN ELECTRIC MACHINE

(71) Applicant: Robert Bosch GmbH, Stuttgart (DE)

(72) Inventors: Michael Bangerter, Oberriexingen (DE); Tino Merkel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 16/096,852

(22) PCT Filed: Mar. 23, 2017

(86) PCT No.: PCT/EP2017/056964
§ 371 (c)(1),
(2) Date: Apr. 1, 2019

(87) PCT Pub. No.: WO2017/186420
PCT Pub. Date: Nov. 2, 2017

(65) Prior Publication Data
US 2019/0229662 A1  Jul. 25, 2019

(30) Foreign Application Priority Data
Apr. 29, 2016  (DE) .................. 10 2016 207 375

(51) Int. Cl.
*H02P 21/14* (2016.01)
*H02P 21/20* (2016.01)
*H02P 21/22* (2016.01)

(52) U.S. Cl.
CPC .......... *H02P 21/141* (2013.01); *H02P 21/20* (2016.02); *H02P 21/22* (2016.02)

(58) Field of Classification Search
CPC ................................ H02P 21/141; H02P 21/20
USPC .......................................... 318/798, 767, 727
See application file for complete search history.

(56) References Cited

U.S. PATENT DOCUMENTS

| 6,828,702 | B2 * | 12/2004 | Beyer | H02K 21/042 290/35 |
| 7,005,828 | B2 * | 2/2006 | Karikomi | H02P 6/185 318/727 |
| 8,587,244 | B2 * | 11/2013 | Takahashi | H02P 21/141 318/400.02 |

FOREIGN PATENT DOCUMENTS

| DE | 60036192 T2 | 5/2008 |
| DE | 102010050344 A1 | 5/2012 |
| DE | 102014205254 A1 | 12/2014 |
| DE | 102014011828 A1 | 2/2016 |

\* cited by examiner

*Primary Examiner* — David Luo
(74) *Attorney, Agent, or Firm* — Michael Best & Friedrich LLP

(57) ABSTRACT

The invention relates to a method for controlling an electric machine (2) subjected to some extent to a reluctance moment in the event of a fault, said method involving the steps of detecting (S1) a degree of demagnetization (10) of the electric machine (2) in the event of a fault, adjusting (S2) a target value generation for controlling the electric machine (2) on the basis of the degree of demagnetization (10), and controlling (S3) the electric machine (2) on the basis of the adjusted target value generation. The invention further relates to a corresponding apparatus (1).

17 Claims, 3 Drawing Sheets

METHOD AND APPARATUS FOR CONTROLLING AN ELECTRIC MACHINE

BACKGROUND OF THE INVENTION

The present invention relates to a method for controlling an electric machine, and a corresponding apparatus.

The present invention is described below mainly with regard to electric machines in vehicles. The present invention is however not limited to this application and may be used in any application in which electric machines are used.

Nowadays electric machines are used in a number of applications. One application for electric machines, in particular permanently excited synchronous machines, may be for example the use as a drive motor in an electric or hybrid vehicle.

It is to be expected particularly in the case of electric machines that have a very high dynamic characteristic, in other words where the loading is constantly changing, that the respective electric machine is subjected to a high thermal loading. Since the limit temperatures and the maximum current loading of the magnet materials are usually used to an optimum degree, the electric machine may be prone to demagnetization when the thermal loadings are high. As a result, a system malfunction may lead to a partial or even complete demagnetization of the electric machine.

A vehicle whose electric machine has become demagnetized is usually no longer able to be moved and must be immobilized.

SUMMARY OF THE INVENTION

Accordingly it is provided:

A method for controlling an electric machine in the event of a malfunction, wherein the electric machine comprises a reluctance torque portion. Such an electric machine may be for example a corresponding permanently excited synchronous machine in an electric vehicle. Such an electric machine may generate a predetermined portion of the torque based on its reluctance. By way of example, the reluctance portion may be between 20% and 60%, in particular 50%. The method comprises the following steps:

Ascertaining a degree of demagnetization of the electric machine in the event of a malfunction. This may be detected for example by means of a higher-level motor control procedure that performs corresponding measures, for example sets an active short circuit mode in the electric machine, Adjusting a desired value generating procedure for controlling the electric machine based on the degree of demagnetization in order for example to ensure the proportionality between a desired torque and a phase current of the electric machine, and Controlling the electric machine based on the adjusted desired value generating procedure.

Moreover it is provided:

An apparatus for controlling an electric machine having a reluctance torque portion in the event of a malfunction, having a control device that is configured in particular so as to control the electric machine based on a vector control procedure, a sensor device that is configured so as to ascertain the degree of demagnetization of the electric machine in the event of a malfunction, and having an adjusting device that is configured so as to adjust the desired value generating procedure of the control device based on the degree of demagnetization.

It is usually no longer possible to operate a permanently excited synchronous machine in which the permanent magnets have been demagnetized. Such a malfunction in particular in a vehicle may lead to it no longer being possible to move the vehicle and for example it not being possible to drive said vehicle to a repair shop.

In contrast to conventional electric machines that have a very small reluctance portion, the present invention uses the information that electric machines that have a high reluctance portion or a reluctance torque portion of for example up to 50% may also be controlled even if the permanent magnets of the electric machine have been demagnetized for example owing to a malfunction.

The subject matter of the present invention may therefore for example also be vehicles that comprise a correspondingly dimensioned electric machine that comprises for example a reluctance portion of 50%. The term "reluctance portion or reluctance torque portion of 50%" is understood to mean that the electric machine generates 50% of its torque via the reluctance portion.

This means simultaneously that in the event of a malfunction the electric machine is always able to generate a torque amounting to 50% of its nominal torque. In the event of a malfunction, it is indeed not possible with this torque for the vehicle to be accelerated to its maximum velocity. However, it is possible for the vehicle to at least be moved in a so-called "limp home" mode. The vehicle may therefore be moved for example out of a danger zone or driven to a repair shop.

In the event of a malfunction, a higher-level motor control procedure in the case of permanently excited synchronous machines usually initiates a so-called "active short circuit mode". It is no longer possible to operate the electric machine in this state. Since it is not possible for high transient currents to flow in an active short circuit mode, such currents may lead to a partial or complete demagnetization of the electric machine. It follows from this that the present invention provides that in the event of a malfunction a degree of demagnetization of the electric machine is ascertained.

After the degree of demagnetization of the electric machine has been ascertained, it is possible to adjust the control procedure of the electric machine to the new parameters of the electric machine, in particular to adjust the desired value generating procedure of the open-loop or closed-loop control. The electric machine may be subsequently controlled accordingly and may continue to be used with reduced torque.

In one embodiment, it is possible during the procedure of ascertaining the degree of demagnetization in an active short circuit mode of the electric machine to ascertain the phase currents and determine the degree of demagnetization based on a relationship between the ascertained phase currents and the nominal currents of the electric machine in the case of an active short circuit mode without demagnetization of the electric machine. This renders it possible to ascertain very quickly the degree of demagnetization immediately after the malfunction has occurred.

In one embodiment, it is possible during the procedure of ascertaining the degree of demagnetization with the electric machine in the freewheel mode to control the phase currents to zero and to determine the degree of demagnetization based on the D-axis voltage in the rotor-fixed coordinate system. The degree of demagnetization may be measured in a time period that in the event of a malfunction the driver does not perceive to be disturbing. It has been determined in experiments that such a measurement requires for example less than 200 ms in which the torque of the electric machine is at zero.

If the electric machine is at a standstill, in other words for example if an electric vehicle is not moving, it is not possible to ascertain the degree of demagnetization of the electric machine. Consequently, it is necessary to set the electric machine in rotation in order to ascertain the degree of demagnetization. It is therefore possible in one embodiment to control the electric machine out of its standstill state and set it in rotation prior to ascertaining the degree of demagnetization of the electric machine based on the characteristic fields and/or parameters of the closed-loop control operation. If the electric machine does not rotate using these parameters, it is possible to assume that a complete demagnetization has occurred.

In one embodiment, the mechanical connection between the electric machine and the elements that are driven by means of the electric machine may be disconnected prior to controlling the electric machine. It is possible in an electric vehicle for example to open the clutch. In other words, the vehicle is not driven as the electric machine rotates. Consequently only a very small amount of power is required in order to set the electric machine in rotation. Moreover, when the vehicle is at a complete standstill, in other words the vehicle is not moving, it is possible to ascertain whether the electric machine may be operated in a problem-free manner. For example, it only possible to release a vehicle for it to be moved after a problem-free emergency operation of the electric machine is verified.

In one embodiment, it is possible based on the ascertained D-axis voltage to calculate the prevailing permanent magnetic flux of the electric machine and to compare the ascertained value with a nominal permanent magnetic flux of the electric machine in order to calculate the degree of demagnetization of the electric machine.

In one embodiment, it is possible during the procedure of adjusting the desired value generating procedure in the closed-loop control procedure of the electric machine to select predetermined characteristic fields and/or parameters for the data of the electric machine for the respective degree of demagnetization. These characteristic fields and parameters relate to variables in the closed-loop control procedure that describe the characteristics of the electric machine. Such characteristics may relate for example to the inductivity of the electric machine or the like.

In one embodiment, it is possible during the procedure of adjusting the desired value generating procedure in the closed-loop control procedure of the electric machine to select predetermined characteristic fields and/or parameters of the closed-loop control procedure for the respective degree of demagnetization. These characteristic fields and parameters may relate for example to the operating characteristic fields and current control parameters in the closed-loop control procedure for the electric machine. A stable closed-loop control circuit is ensured by means of adjusting these parameters and the operating point is set to an optimum under the boundary conditions that are predetermined by means of the demagnetization.

In one embodiment, it is possible during the control procedure of the electric machine to perform a closed-loop control procedure based on the selected characteristic fields and/or parameters. It is therefore possible to continue to operate the electric machine based on its reluctance portion even if said electric machine is partially or completely demagnetized.

The above embodiments and further developments may be randomly combined with one another insofar as is expedient. Further possible embodiments, further developments and implementations of the invention also comprise combinations that are not explicitly mentioned of features of the invention that have been previously described or are to be described below. In particular, the person skilled in the art will also in this case add individual aspects as improvements or additions to the respective basic form of the present invention.

BRIEF DESCRIPTION OF THE DRAWINGS

The present invention is explained in greater detail below with reference to the exemplary embodiments disclosed in the schematic figures of the drawings. In the drawings.

Like or like-functioning elements and devices—unless otherwise stated—are provided with the same reference numerals in all the figures.

DETAILED DESCRIPTION

Figure 1:
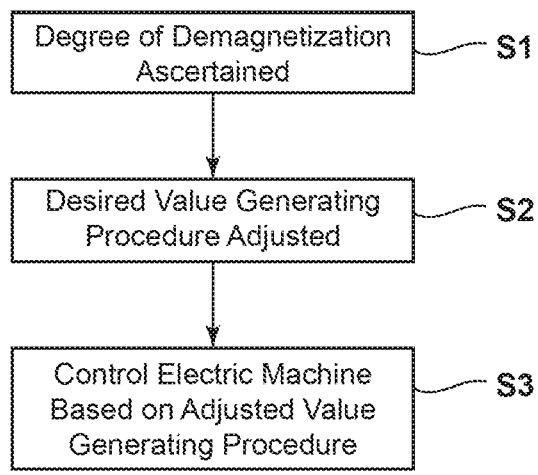
FIG. 1 illustrates a flowchart of one embodiment of a method in accordance with the invention.
Figure 4:
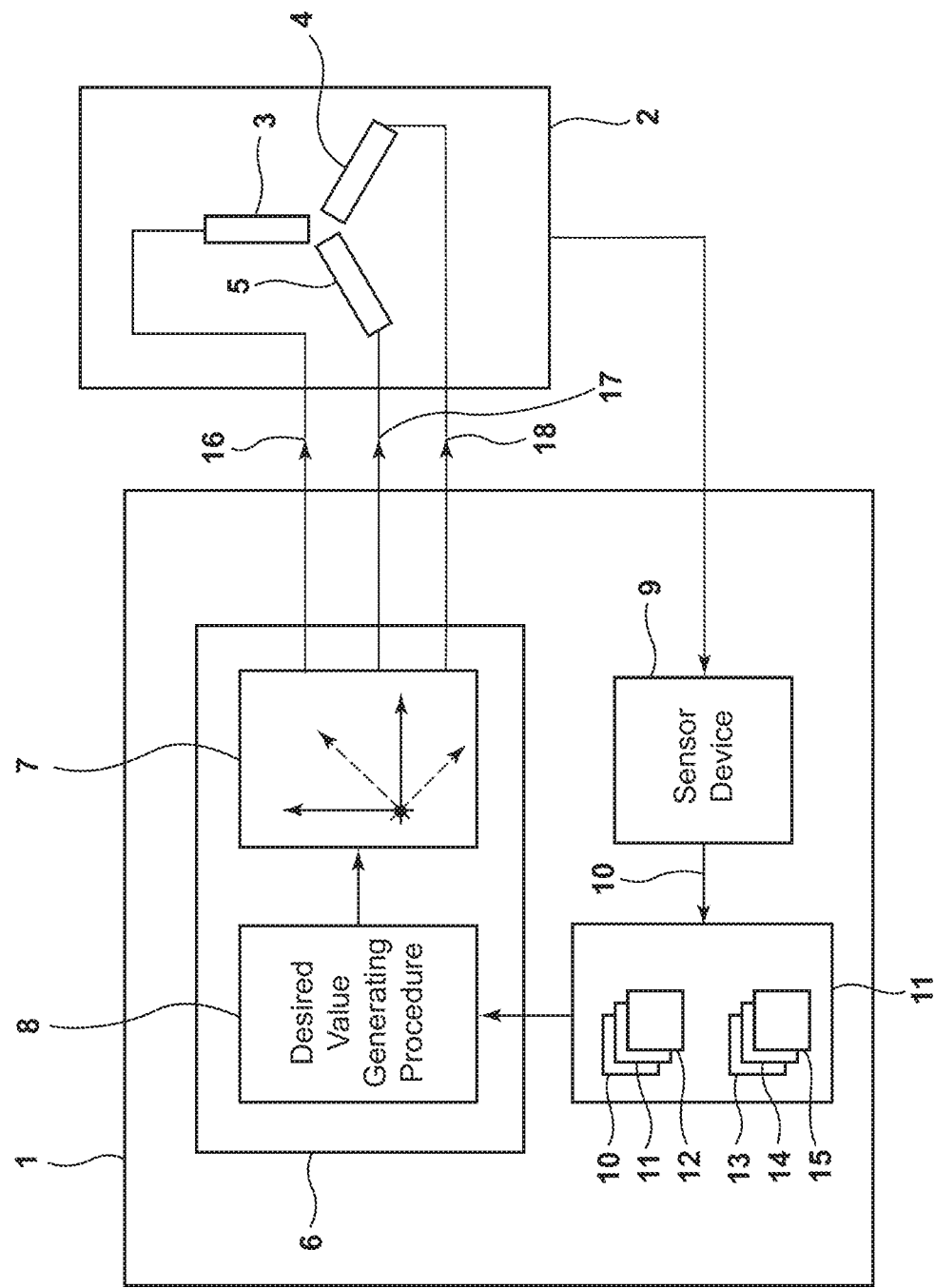
FIG. 4 illustrates a block diagram of one embodiment of an apparatus in accordance with the invention.

FIG. 1 illustrates a flowchart of one embodiment of a method in accordance with the invention for controlling an electric machine (cf. FIG. 4). The method is based on the fact that the electric machine 2 comprises a reluctance torque portion that is sufficiently large for example to move a vehicle in the event of a malfunction even if the movement is performed with reduced dynamics and at a slower speed.

The method is performed in this case in the event of a malfunction of the electric machine 2 or of the drive system (not separately illustrated) in order to render possible an emergency operation.

Consequently, in the event of a malfunction, the degree of demagnetization 10 of the electric machine 2 is ascertained, S1. Based on this ascertained degree of demagnetization 10, a desired value generating procedure 8 is adjusted for the open-loop control or closed-loop control of the electric machine 2, S2. Finally, the electric machine 2 is controlled based on the adjusted desire value generating procedure 8, S3.

If an electric machine 2 comprises for example a reluctance torque portion of 50%, it is still possible in the case of a complete demagnetization of the electric machine 2 in the event of a malfunction to produce a torque of 50% of the nominal torque of the electric machine 2.

The degree of demagnetization 10 may be ascertained at least in two different states of the electric machine 2.

In the active short circuit mode of the electric machine 2 it is possible for this purpose to ascertain the phase currents 16, 17, 18 of the electric machine 2 and to determine the degree of demagnetization 10 based on a relationship between the ascertained phase currents 16, 17, 18 and the nominal currents of the electric machine 2 in the case of an active short circuit mode without demagnetization of the electric machine 2.

Alternatively, it is possible during the procedure of ascertaining S1 the degree of demagnetization 10 with the electric machine 2 in the freewheel mode to control the phase currents 16, 17, 18 to zero, also referred to as a currentless closed-loop control procedure. It is subsequently possible to determine the degree of demagnetization 10 based on the D-axis voltage in the rotor-fixed coordinate system.

In order to ascertain the degree of demagnetization 10, it is necessary for the electric machine 2 to rotate. Consequently, it is possible based on the characteristic fields and/or parameters of the closed-loop control operation to control the electric machine 2 out of its standstill state and set it in rotation prior to ascertaining S1 the degree of demagnetization 10. This may be the case for example if it is not possible to determine the degree of demagnetization 10 after the malfunction has occurred until a vehicle comes to a standstill.

If for example a vehicle is at a standstill, it is possible prior to controlling the electric machine 2 to disconnect the mechanical connection between the electric machine 2 and the elements that are driven by means of the electric machine 2. The electric machine 2 is consequently not subjected to a loading and may be set in rotation very easily.

If the phase currents 16, 17, 18 are controlled to zero, the prevailing permanent magnetic flux of the electric machine 2 is calculated based on the ascertained D-axis voltage and the ascertained value is compared with a nominal permanent magnetic flux of the electric machine 2 in order to calculate the degree of demagnetization 10 of the electric machine 2.

In order to be able to use the information of the degree of demagnetization 10 in the control procedure of the electric machine 2, it is possible during the adjusting procedure S2 in the control procedure of the electric machine 2 to select predetermined characteristic fields and/or parameters 10-12 for the data of the electric machine 2. These characteristic fields and parameters relate to variables in the closed-loop control procedure that describe the characteristics of the electric machine. Such characteristics may relate for example to the inductivity of the electric machine or the like. Such characteristic fields and/or parameters 10-12 may be predetermined in this case for different degrees of the demagnetization 10. If a characteristic field and/or parameter 10-12 is not available for a specific degree of demagnetization 10, such a characteristic field and/or parameter may also be interpolated. It is likewise possible to select predetermined characteristic fields and/or parameters 13-14 of the closed-loop control procedure for the respective degree of demagnetization 10. These characteristic fields and/or parameters may relate for example to operating characteristic fields and current control parameters in the closed-loop control procedure for the electric machine.

Finally, during the control procedure S3 of the electric machine 2, a closed-loop control procedure, preferably a vector-based closed-loop control procedure, is performed based on the selected characteristic fields and/or parameters 10-15.

Figure 2:
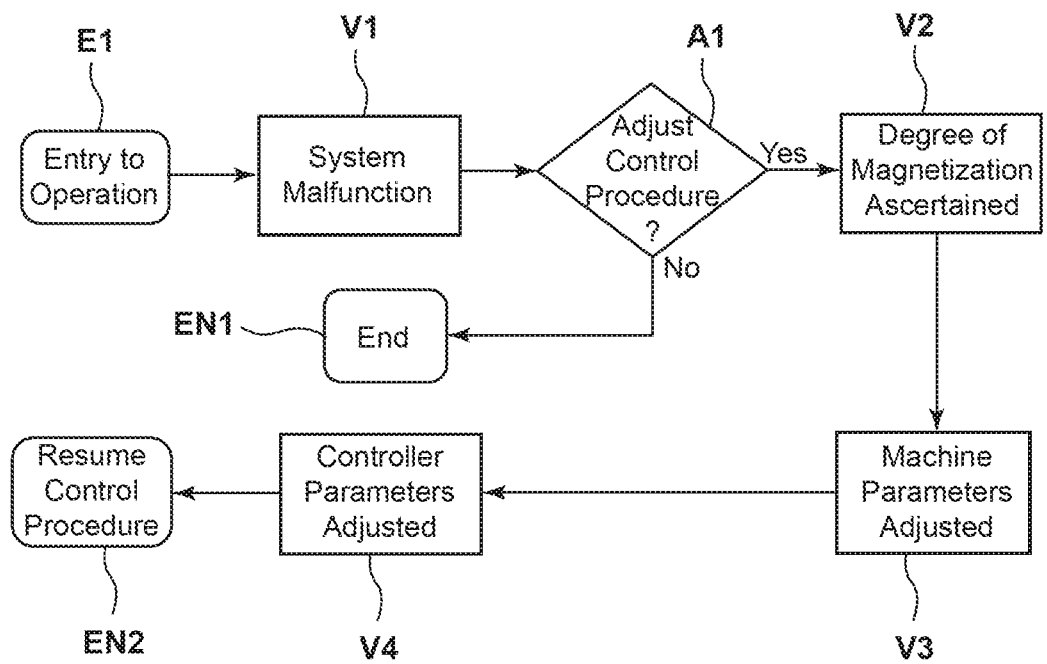
FIG. 2 illustrates a flowchart of a further embodiment of a method in accordance with the invention.

FIG. 2 illustrates a flowchart of a further embodiment of a method in accordance with the invention.

The method shown in FIG. 2 starts at the entry node E1 in which a closed-loop control operation of the electric machine 2 is performed. The process V1 represents the occurrence of a system malfunction that leads to the electric machine 2 being switched off. Such a process V1 may be triggered for example by means of monitoring excess current in the drive system.

In the decision node A1, a selection is made as to whether it is necessary or not necessary to adjust the control procedure of the electric machine 2. If it is not necessary to make such an adjustment, because for example demagnetization has not occurred, the method terminates at the end node EN1. However, if it is necessary to make an adjustment, the degree of the magnetization of the electric machine 2 is ascertained in process V2 and in process V3 the machine parameterization is adjusted in the control procedure of the electric machine 2 according to the ascertained degree of demagnetization 10. Finally, in process V4, the controller parameterization in the control procedure of the electric machine 2 is adjusted according to the ascertained degree of demagnetization 10. The control procedure of the electric machine 2 is subsequently resumed in the end node EN2.

Figure 3:
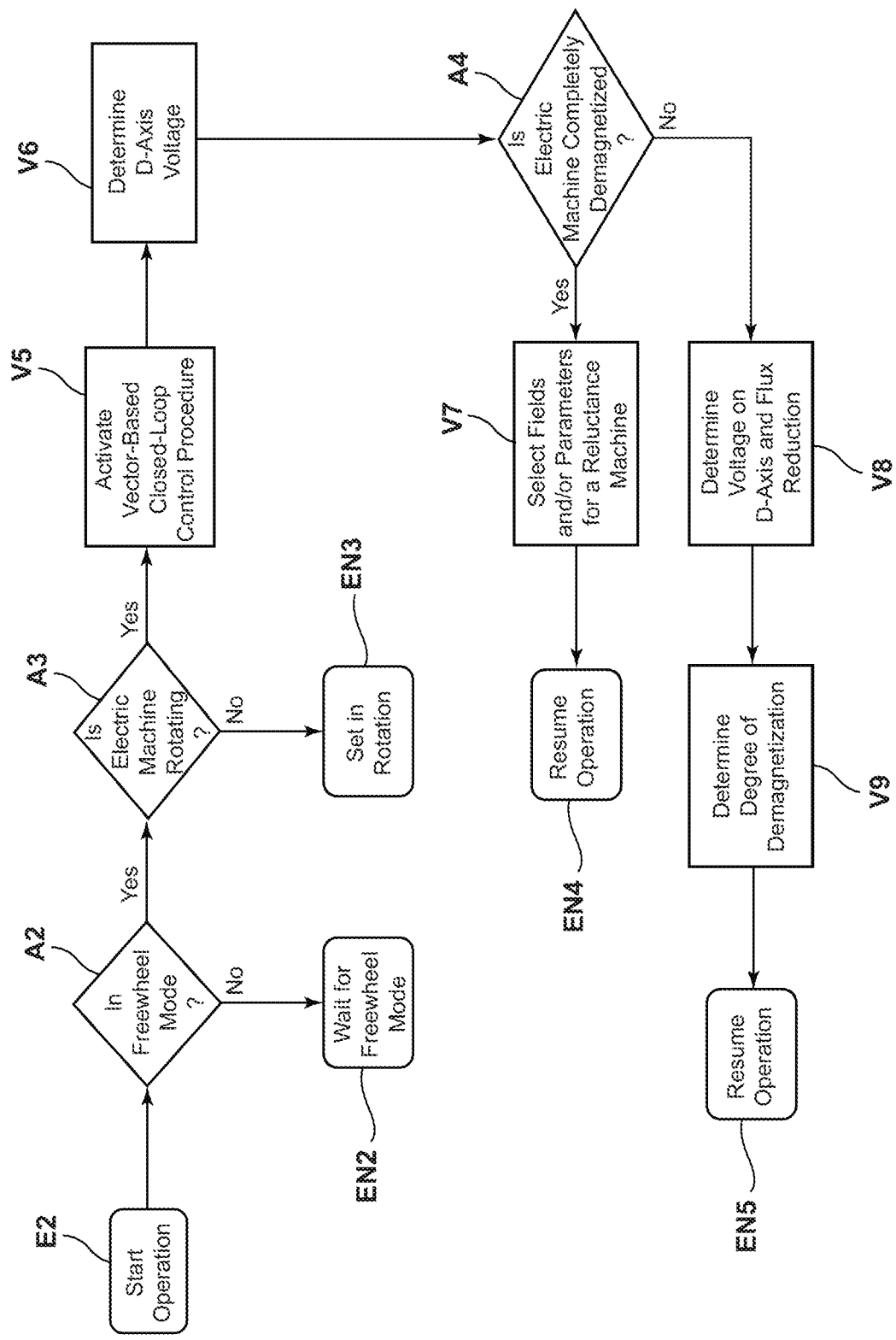
FIG. 3 illustrates a flowchart of a further embodiment of a method in accordance with the invention.

FIG. 3 illustrates a flowchart of a further embodiment of this part of the method in accordance with the invention with which the degree of demagnetization 10 is determined.

The entry node E2 represents the start of the ascertaining procedure. Decision A2 verifies whether the electric machine 2 is in the freewheel mode. If this is not the case because the system is located for example in the active short circuit mode, the method waits in the end node EN2 until the electric machine 2 is in the freewheel mode and the method recommenced at E2.

If the electric machine 2 is in the freewheel mode in A2, it is verified in A3 whether the electric machine 2 is rotating. If this is not the case, in EN3 the electric machine 2 is set in rotation using the nominal parameters and/or characteristic fields of the closed-loop control procedure in the problem-free operation. If the electric machine 2 is rotating, in V5 a vector-based closed-loop control procedure of the current is activated that controls the phase currents 16, 17, 18 to zero. In V6, the D-axis voltage is determined in the rotor-fixed coordinate system.

A decision is undertaken in A4 as to whether the electric machine 2 is completely demagnetized or not. If this is the case, in V7 the characteristic fields and/or parameters 10-15 in the control procedure of the electric machine 2 are selected for an electric machine 2 without magnetic flux, in other words for a reluctance machine.

If the electric machine 2 is not completely demagnetized, the voltage indicator on the D-axis in the rotor-fixed coordinate system is determined in V8 and the flux reduction in the electric machine 2, in other words the degree of demagnetization 10, is determined in V9. It is possible for this purpose to also perform for example a temperature compensating procedure of the voltage indicator on the D-axis.

Finally, in EN5 the operation of electric machine 2 is resumed with the corresponding characteristic fields and/or parameters that correspond to the respective degree of demagnetization 10.

FIG. 4 illustrates a block diagram of an embodiment of an apparatus 1 in accordance with the invention for controlling an electric machine 2 having a reluctance torque portion in the event of a malfunction. A three-phase asynchronous machine 2 having a reluctance torque portion of 50% is illustrated in FIG. 4. It goes without saying that depending upon the design of the asynchronous machine 2 other reluctance torque portions may be available and the invention is to be used in a similar manner. As a result of this, there is only a change in the amount of torque that may be provided by the electric machine in the event of a malfunction.

The apparatus 1 comprises a control device 6. Said control device controls the electric machine 2 based on a vector control procedure 7 or on a so-called vector-based control procedure 7. In the case of such a control procedure, the desired currents are calculated in a rotor-fixed coordinate system and subsequently transformed into the stator-fixed coordinate system in order to control the electric machine 2. In one embodiment, the control device 6 may also be a component of a higher-level control procedure in the drive system and comprise a corresponding interface to the other components of the apparatus 1. Moreover, at least some of the components of the apparatus 1 may be integrated in the higher-level control procedure, for example as software components and use its sensors and other components.

Moreover, a sensor device 9 is provided in the apparatus 1. Said sensor device ascertains a degree of demagnetization 10 of the electric machine 2 in the event of a malfunction. For this purpose the sensor device 9 may use the above explained method steps for example.

The sensor device 9 may ascertain the phase currents 16-18 in the active short circuit mode of the electric machine 2 and determine the degree of demagnetization 10 based on a relationship between the ascertained phase currents 16-18 and the nominal currents of the electric machine 2 in the case of an active short circuit mode without demagnetization of the electric machine 2. The sensor device 9 may comprise for this purpose dedicated sensors or sensors of the higher-level control procedure.

Alternatively, the sensor device 9 may control the phase currents 16-18 to zero with the electric machine 2 in the freewheel mode and determine the degree of demagnetization 10 based on the D-axis voltage in the rotor-fixed coordinate system. It is possible for this purpose based on the ascertained D-axis voltage to calculate the prevailing permanent magnetic flux of the electric machine 2 and to compare the ascertained value with a nominal permanent magnetic flux of the electric machine 2. The degree of demagnetization 10 of the electric machine 2 may be determined based on this relationship.

If the electric machine 2 is at a standstill, the sensor device 9 may control the electric machine 2 and set it in rotation based on the characteristic fields and/or parameters of the closed-loop control operation prior to ascertaining the degree of demagnetization 10. It is possible prior to this to disconnect the mechanical connection between the electric machine 2 and the elements that are driven by means of the electric machine 2 before the control procedure of the electric machine 2.

An adjusting device 11 uses the information regarding the degree of demagnetization 10 and adjusts a desired value generating procedure 8 of the control device 6 based on the degree of demagnetization 10 with the result that the optimum degree of efficiency is achieved with the electric machine 2 under the given boundary conditions.

During the adjusting procedure of the desired value generating procedure 8, the adjusting device 11 may transmit for the respective degree of demagnetization 10 to the control device 6 predetermined characteristic fields and/or parameters 10-12 for the data of the electric machine 2 and/or predetermined characteristic fields and/or parameters 13-15 in the closed-loop control procedure or select said characteristic fields and/or parameters in the control device 6 if they are already stored in the control device 6.

Finally, the control device 6 may use the selected characteristic fields and/or parameters 10-15 in order to perform a closed-loop control procedure of the electric machine 2.

Although the present invention has been described above with reference to preferred exemplary embodiments, it is not limited to said exemplary embodiments but rather may be modified in numerous ways. In particular the invention may be changed or modified in various ways without deviating from the core of the invention.

The invention claimed is:
1. A method for controlling an electric machine (2) having a reluctance torque portion, the method comprising:
ascertaining (S1), via a sensor device (9), a degree of demagnetization (10) of the electric machine (2) in the event of a malfunction;
adjusting (S2) a desired value generating procedure for controlling the electric machine (2) based on the degree of demagnetization (10); and
controlling (S3), via a programmable control device (6), the electric machine (2) based on the adjusted desired value generating procedure.

2. The method as claimed in claim 1, further comprising ascertaining phase currents (16-18) and wherein the degree of demagnetization (10) is determined based on a relationship between the phase currents (16-18) and nominal currents of the electric machine (2) in the case of an active short circuit mode without demagnetization of the electric machine (2).

3. The method as claimed in claim 1, wherein in a freewheel mode the phase currents (16-18) are controlled to zero and the degree of demagnetization (10) is determined based on a D-axis voltage in the rotor-fixed coordinate system.

4. The method as claimed in claim 3, wherein, based on characteristic fields and/or parameters of closed-loop control operation, the electric machine (2) is controlled out of a standstill state and set in rotation prior to ascertaining (S1) the degree of demagnetization (10).

5. The method as claimed in claim 4, wherein the mechanical connection between the electric machine (2) and the elements that are driven by means of the electric machine (2) is disconnected prior to controlling the electric machine (2).

6. The method as claimed in claim 3, wherein based on the ascertained D-axis voltage the prevailing permanent magnetic flux of the electric machine (2) is determined and compared with a nominal permanent magnetic flux of the electric machine (2) in order to determine the degree of demagnetization (10) of the electric machine (2).

7. The method as claimed in claim 1, wherein during adjusting (S2) the desired value generating procedure in the closed-loop control procedure of the electric machine (2) predetermined characteristic fields and/or parameters (10-12) for the data of the electric machine (2) are selected and/or provided for the respective degree of demagnetization (10).

8. The method as claimed in claim 7, wherein during the control procedure (S3) of the electric machine (2) a closed-loop control procedure is performed based on the selected and/or provided characteristic fields and/or parameters (10-15).

9. A method for controlling an electric machine (2) having a reluctance torque portion, the method comprising:
ascertaining (S1), via a sensor device (9), a degree of demagnetization (10) of the electric machine (2) in the event of a malfunction;
adjusting (S2) a desired value generating procedure for controlling the electric machine (2) based on the degree of demagnetization (10); and
controlling (S3), via a programmable control device (6), the electric machine (2) based on the adjusted desired value generating procedure
wherein during adjusting (S2) the desired value generating procedure in the closed-loop control procedure of the electric machine (2) predetermined characteristic fields and/or parameters in a closed-loop control procedure are selected and/or provided for the respective degree of demagnetization (10).

10. An apparatus for controlling an electric machine (2) having a reluctance torque portion in the event of a malfunction, said apparatus having:
- a control device (6) that is configured so as to control the electric machine (2);
- a sensor device (9) that is configured so as to ascertain a degree of demagnetization (10) of the electric machine (2) in the event of a malfunction;
- an adjusting device (11) that is configured so as to adjust a desired value generating procedure (8) of the control device (6) based on the degree of demagnetization (10).

11. The apparatus as claimed in claim 10, wherein the sensor device (9) is configured so as during ascertaining the degree of demagnetization (10) in the active short circuit mode of the electric machine (2) to ascertain the phase currents (16-18) and to determine based on a relationship between the ascertained phase currents (16-18) and the nominal currents of the electric machine (2) the degree of demagnetization (10) in the case of an active short circuit mode without demagnetization of the electric machine (2).

12. The apparatus as claimed in claim 10, wherein the sensor device (9) is configured so as during ascertaining the degree of demagnetization (10) with the electric machine (2) in the freewheel mode to control the phase currents (16-18) to zero and to determine the degree of demagnetization (10) based on the D-axis voltage in the rotor-fixed coordinate system, and
wherein the sensor device (9) is configured in particular so as to control the electric machine (2) out of its standstill state and set it in rotation prior to ascertaining the degree of demagnetization (10) based on the characteristic fields and/or parameters of the closed-loop control operation, and in particular prior to controlling the electric machine (2) to disconnect the mechanical connection between the electric machine (2) and the elements that are driven by means of the electric machine (2).

13. The apparatus as claimed in claim 12, wherein the sensor device (9) is configured so as based on the ascertained D-axis voltage to determine the prevailing permanent magnetic flux of the electric machine (2) and to compare it with a nominal permanent magnetic flux of the electric machine (2) in order to determine the degree of demagnetization (10) of the electric machine (2).

14. The apparatus as claimed in claim 10, wherein the adjusting device (11) is configured so as during adjusting the desired value generating procedure (8) in the control device (6) to select predetermined characteristic fields and/or parameters (10-12) for the data of the electric machine (2) for the respective degree of demagnetization (10); and/or wherein the adjusting device (11) is configured so as during adjusting the desired value generating procedure (8) in the control device (6) to select predetermined characteristic fields and/or parameters (13-15) of a closed-loop control procedure for the respective degree of demagnetization (10).

15. The apparatus as claimed in claim 14, wherein the control device (6) is configured so as to perform the closed-loop control procedure of the electric machine (2) based on the selected characteristic fields and/or parameters (10-15).

16. The apparatus as claimed in claim 10, wherein the adjusting device (11) is configured so as during adjusting the desired value generating procedure (8) in the control device (6) to select predetermined characteristic fields and/or parameters (10-12) for the data of the electric machine (2) for the respective degree of demagnetization (10).

17. The apparatus as claimed in claim 10, wherein the adjusting device (11) is configured so as during adjusting the desired value generating procedure (8) in the control device (6) to select predetermined characteristic fields and/or parameters (13-15) of a closed-loop control procedure for the respective degree of demagnetization (10).

* * * * *